(12) United States Patent
Kuroda (10) Patent No.: US 6,732,074 B1
(45) Date of Patent: May 4, 2004

(54) DEVICE FOR SPEECH RECOGNITION WITH DICTIONARY UPDATING

(75) Inventor: Masaru Kuroda, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 09/492,280

(22) Filed: Jan. 27, 2000

(30) Foreign Application Priority Data

Jan. 28, 1999 (JP) .......................................... 11-019555

(51) Int. Cl.7 .............................................. G10L 15/06
(52) U.S. Cl. ...................................... 704/244; 704/254
(58) Field of Search ................................ 704/244, 249, 704/254, 10, 243

(56) References Cited

U.S. PATENT DOCUMENTS

| | | | | |
|---|---|---|---|---|
| 3,770,892 A | * | 11/1973 | Clapper ...................... | 704/251 |
| 4,618,984 A | * | 10/1986 | Das et al. .................... | 704/244 |
| 4,703,504 A | * | 10/1987 | Vittorelli .................... | 704/254 |
| 5,774,841 A | * | 6/1998 | Salazar et al. ............... | 704/225 |
| 5,842,168 A | * | 11/1998 | Miyazawa et al. ........... | 704/275 |
| 5,920,837 A | * | 7/1999 | Gould et al. ................. | 704/251 |

OTHER PUBLICATIONS

Homma, Shigeru, Jun–ichi Takahashi, and Shigeki Sagayama, "Iterative Unsupervised Speaker Adaptation for Batch Dictation," Proc. Fourth Int. Conf. on Spoken Language, 1996, ICSLP 96, Oct. 3–6, 1996, vol. 2, pp. 1141–1144.*

* cited by examiner

Primary Examiner—Vijay Chawan
Assistant Examiner—Donald L. Storm
(74) Attorney, Agent, or Firm—Dickstein Shapiro Morin & Oshinsky LLP (57) ABSTRACT

A standard dictionary; a feature extracting unit which extracts features from an input speech; a matching unit which performs matching between the features of the input speech extracted by the feature extracting unit and the standard dictionary; a result outputting unit which outputs a matching result in the matching unit; and a dictionary updating portion which updates the standard dictionary are provided. The standard dictionary is built initially as a dictionary to be used for recognizing speeches produced by any independent speaker; and the dictionary updating unit updates the standard dictionary so as to provide a dictionary to be used for recognizing speeches produced by a dependent speaker based on the result of matching between the features extracted from the input speech and the standard dictionary.

5 Claims, 7 Drawing Sheets

DEVICE FOR SPEECH RECOGNITION WITH DICTIONARY UPDATING

BACKGROUND OF THE INVENTION

1. Field of the Invention

The present invention relates to a speech-recognition device.

2. Description of the Related Art

Generally speaking, in a speech-recognition device, in order to enable recognition of speeches produced by a dependent speaker, the dependent speaker is caused to pronounce a predetermined word or the like so that a dictionary used for recognizing speeches produced by the dependent speaker is built. In such a case, in order to build a dictionary used for recognizing speeches produced by a dependent speaker, the dependent speaker needs to pronounce a word or the like once through thrice.

When a dependent speaker pronounces a word or the like only once, a burden to be borne by the speaker is relatively light. However, a good dictionary may not be built due to the environment (for example, background noise, and/or speeches of surrounding persons) at the time of registration of the dictionary. This is because the surrounding sound is mixed to a speech produced by the dependent speaker. As a result, the quality of the thus-registered dictionary is degraded.

In contrast to this, when a dictionary is built (registered) in a condition in which a dependent speaker produces a speech a plurality of times (for example, thrice), it is possible to build an average dictionary based on the speeches obtained from the plurality of times of pronunciations. Alternatively, it is possible that a dictionary is built using the first-produced speech, and, then, using the second or third-produced speech, matching against the dictionary is performed so that the quality of the dictionary is evaluated. In any case, a good dictionary can be built in comparison to the case where a dependent speaker produces a speech only once.

However, when a dependent speaker is caused to pronounce the same word twice or thrice repeatedly, to build a dictionary is a burden to the person. For example, when 20 words through 30 words are registered with the dictionary, to build the dictionary is a very heavy burden to the person.

SUMMARY OF THE INVENTION

An object of the present invention is to provide a speech-recognition device in which a good dictionary to be used for recognizing speeches produced by a dependent speaker can be built without burdening the dependent speaker much.

In order to achieve the above-mentioned object, a device for speech recognition, according to the present invention, comprises:

a standard dictionary;

a feature extracting unit which extracts features from an input speech;

a matching unit which performs matching of the features of the input speech extracted by the feature extracting unit against the standard dictionary;

a result outputting unit which outputs a matching result in the matching unit; and a dictionary updating portion which updates the standard dictionary, wherein:

the standard dictionary is built initially as a dictionary to be used for recognizing speeches produced by any independent speaker; and the dictionary updating unit updates the standard dictionary so as to provide a dictionary to be used for recognizing speeches produced by a dependent speaker based on the result of matching of the features extracted from the input speech against the standard dictionary.

The standard dictionary may be built initially as a dictionary to be used for recognizing speeches produced by any independent speaker as a result of standard features of each string of characters being disintegrated into phoneme units, the-thus-obtained features of the respective phonemes being used as phoneme information, and the connection of the phonemes being used as path information;

the matching unit, when comparing features of input phonemes determined from the features extracted from the input speech for a string of characters with the phoneme information in the standard dictionary corresponding to the string of characters, may perform evaluation of phoneme distance between the features of the input phonemes and the phoneme information in the standard dictionary corresponding to the string of characters; and the dictionary updating unit, based on the result of the evaluation of phoneme distance, may update the phoneme information in the standard dictionary corresponding to the string of characters, and, thus, update the standard dictionary so as to provide a dictionary to be used for recognizing speeches produced by a dependent speaker.

The dictionary updating unit may update the phoneme information in the standard dictionary corresponding to the string of characters, and, thus, update the standard, only when the phoneme distance between the features of the input phonemes and the phoneme information in the standard dictionary corresponding to the string of characters exceeds a predetermined threshold as a result of the evaluation of phoneme distance.

The dictionary updating unit may update the phoneme information in the standard dictionary corresponding to the vowels of the string of characters, and, thus, update the standard, only when the phoneme distance between the features of the input phonemes and the phoneme information in the standard dictionary corresponding to the string of characters exceeds a predetermined threshold as a result of the evaluation of phoneme distance.

Thus, according to the present invention, a standard dictionary; a feature extracting unit which extracts features from an input speech; a matching unit which performs matching of the features of the input speech extracted by the feature extracting unit against the standard dictionary; a result outputting unit which outputs a matching result in the matching unit; and a dictionary updating portion which updates the standard dictionary are provided. The standard dictionary is built initially as a dictionary to be used for recognizing speeches produced by any independent speaker; and the dictionary updating unit updates the standard dictionary so as to provide a dictionary to be used for recognizing speeches produced by a dependent speaker based on the result of matching of the features extracted from the input speech against the standard dictionary. Thereby, it is possible to remarkably ease the burden to be borne by a dependent speaker needed for producing a dictionary to be used for recognizing speeches produced by the dependent speaker. Further, because it is possible to build a dictionary, to be used for recognizing speeches produced by a dependent speaker, using information in a dictionary to be used for recognizing speeches produced by any independent speaker, it is possible to provide a high-performance, superior-user-interface speech-recognition device Especially, in the arrangement in which only the phoneme information in a dictionary corresponding to vowels of a string of characters is updated, it is possible to remarkably improve the performance of the dictionary, considering that information to be updated is a little. As a result, it is possible to reduce the size of, and, also to improve the performance of the speech-recognition device.

Other objects and further features of the present invention will become more apparent from the following detailed description when read in conjunction with the accompanying drawings.

DETAILED DESCRIPTION OF THE PREFERRED EMBODIMENT

Figure 1:
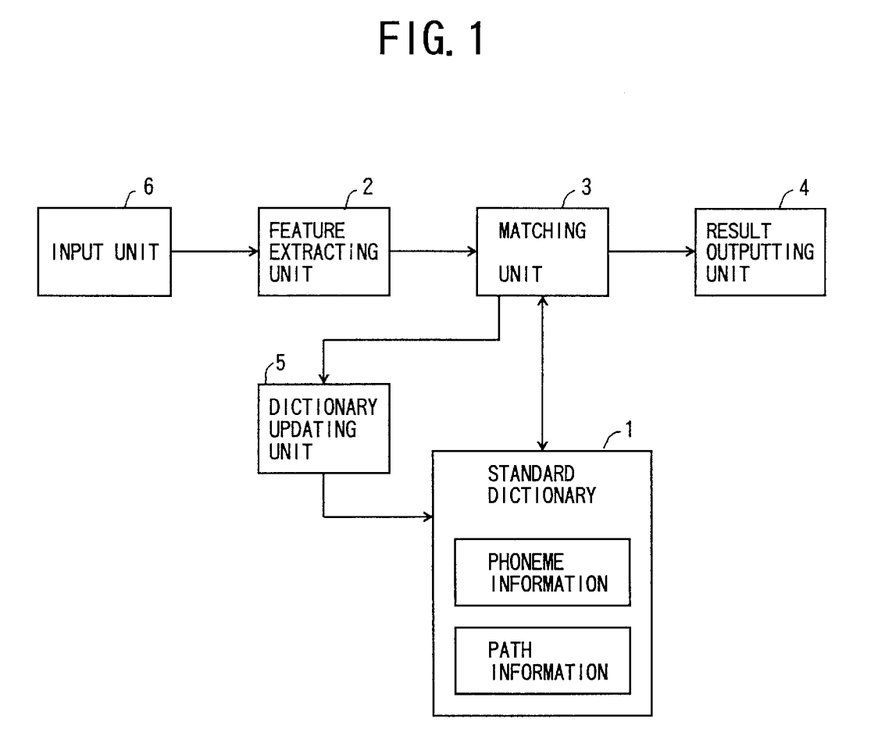
FIG. 1 shows a block diagram of a speech-recognition device in one embodiment of the present invention.

An embodiment of the present invention will now be described based on figures. FIG. 1 shows an arrangement of a speech-recognition device in the embodiment of the present invention. As shown in FIG. 1, the speech-recognition device includes a standard dictionary 1, an input unit 6 for inputting a speech produced by a person, a feature extraction unit 2 which extracts features from the speech input via the input unit 6, a matching unit 3 which matches the features of the input speech against the standard dictionary 1, a result outputting unit 4 which outputs the matching result in the matching unit 3, and a dictionary updating unit 5 which updates the standard dictionary 1. Here, initially, the standard dictionary 1 is built as a dictionary to be used for recognizing speeches produced by any independent speaker, and, based on the result of matching of the features extracted from the input speech against the standard dictionary 1, the dictionary updating unit 5 updates the standard dictionary 1 so as to provide a dictionary to be used for recognizing speeches produced by a dependent speaker.

Specifically, initially, the standard dictionary 1 is built using standard features of phonemes of strings of characters as phoneme information, as a dictionary to be used for recognizing speeches produced by any independent speaker. Such standard features of phonemes of strings of characters may be those which can be obtained through the prior art in the field of the speech-recognition technology. When matching the features of the input phonemes determined from the features extracted from the input speech produced for a string of characters against the phoneme information in the standard dictionary 1 corresponding to the string of characters, the matching unit 3 performs an evaluation of phoneme distance between the features of the input phonemes and the phoneme information in the standard dictionary 1 corresponding to the string of characters. Based on the result of the evaluation of phoneme distance, the dictionary updating unit 5 updates the phoneme information in the standard dictionary 1 corresponding to the string of characters, thus updating the standard dictionary 1 so as to provide a dictionary to be used for recognizing speeches produced by the dependent speaker.

Here, the standard dictionary 1 is built using the phoneme information and path information of strings of characters, as a dictionary to be used for recognizing speeches produced by any independent speaker, initially. For example, when the standard dictionary 1 is built for the string of characters, 'aki' (Japanese word), the standard features of this string of characters is divided into phoneme units, i.e., 'a', 'a-k','k', 'k-i', and 'i'. The thus-obtained features of these five phonemes are stored in the standard dictionary 1 as the phoneme information in phoneme units. Further, the information that the phonemes appear in the order of 'a', 'a-k', 'k', 'k-i', and 'i' is stored in the standard dictionary 1 as the path information. Such conversion from a string of characters into the phoneme information and path information may be performed in the speech-recognition device, or may be performed using a separate device provided for character-string conversion.

In this case, when the speech input via the input unit 6 is 'aki', for example, the feature extracting unit 2 extracts the features of this speech, and the matching unit 3 compares the thus-extracted features of the speech 'aki' with the phoneme information in the standard dictionary 1 so as to determine whether the phoneme information similar to the extracted features of the input speech 'aki' exists in the standard dictionary 1. As a result, in this case, because the phoneme information corresponding to the string of characters 'aki' is stored in the standard dictionary 1 as mentioned above, the matching unit 3 determines that the phoneme information similar to the extracted features of the input speech 'aki' exists in the standard dictionary 1, and, thus, determines that the input speech includes the phonemes 'a', 'a-k', 'k', 'k-i', and 'i' and that these phonemes appear in the stated order in the input speech. Then, the matching unit 3 determines whether the path information which agrees with the thus-obtained information for the input speech 'aki' that the phonemes 'a', 'a-k', 'k', 'k-i', and 'i' appear in the stated order exists in the standard dictionary 1. As a result, in this case, because the path information corresponding to the string of characters 'aki' that the phonemes 'a', 'a-k', 'k', 'k-i', and 'i' appear in the stated order is stored in the standard dictionary 1 as mentioned above, the matching unit 3 determines that the path information which agrees with the obtained information for the input speech that the phonemes 'a', 'a-k', 'k', 'k-i', and 'i' appear in the stated order exists in the standard dictionary 1, and, thus, that the input speech corresponds to the string of characters 'aki'. Then, receiving this matching result from the matching unit 3, the result outputting unit 4 outputs the information that the input speech corresponds to the string of characters 'aki'.

Further, the matching unit 3 calculates a phoneme distance (similarity measure) between the features of the phonemes 'a', 'a-k', 'k', 'k-i', and 'i' (input phonemes) of the input speech 'aki' and the phoneme information 'a', 'a-k', 'k', 'k-i', and 'i' in the standard dictionary 1 corresponding to the string of characters 'aki', the path information of which agrees with the corresponding information for the input speech as mentioned above. Specifically, in this case, the phoneme distance X is, for example, calculated as the sum of distances (similarity measures) X ('a'), X(a-k), X('k'), X ('k-i'), and X ('i') between the features of the phonemes 'a', 'a-k', 'k', 'k-i', and 'i' of the input speech 'aki' and the features of the corresponding phonemes 'a', 'a-k', 'k', 'k-i', and 'i' stored in the standard dictionary 1, respectively.

Then, only when the thus-obtained phoneme distance between the features of the input phonemes and the phoneme information in the standard dictionary 1 corresponding to the string of characters as a result of the above-described phoneme-distance evaluation exceeds a predetermined threshold, the dictionary updating unit 5 updates the phoneme information in the standard dictionary 1 corresponding to the string of characters, and, thus, updates the standard dictionary 1. Specifically, in the above-mentioned example, the features of the phonemes 'a', 'a-k', 'k', 'k-i', and 'i' currently registered with the standard dictionary 1 are replaced with the features of the phoneme information 'a', 'a-k', 'k', 'k-i', and 'i' of the input speech.

Alternatively, it is possible that, as a result of the evaluation of phoneme distance between the features of the input phonemes and the phoneme information in the standard dictionary 1 corresponding to the string of characters performed by the matching unit 3, only when the phoneme distance between the features of the input phonemes and the phoneme information in the standard dictionary 1 corresponding to the string of characters exceeds the predetermined threshold, the dictionary updating unit 5 updates the features of the phonemes in the standard dictionary 1 corresponding to the vowels of the string of characters, and, thus, updates the standard dictionary 1. Specifically, in the above-mentioned example, it is possible to replace the features of the phonemes 'a' and 'i', corresponding to the vowels, of the features of the phonemes 'a', 'a-k', 'k', 'k-i', and 'i' currently registered in the standard dictionary 1 with the features of the phonemes 'a' and 'i', corresponding to the vowels, of the features of the phonemes 'a', 'a-k', 'k', 'k-i', and 'i' of the input speech.

Such processing for updating the standard dictionary 1 may be performed when pronunciation for registration with the standard dictionary 1 is performed. Alternatively, such processing for updating the standard dictionary 1 may be performed when pronunciation for speech recognition is performed. That is, input speech for updating the standard dictionary 1 may be a speech produced for speech recognition, or may be a speech produced for registration.

Operation of the speech-recognition device shown in FIG. 1 will now be described. First, description will be made for the case where pronunciation for registration with the standard dictionary 1 is performed. A speaker produces a speech once for registration with the standard dictionary 1 for a string of characters. When the thus-produced speech is input via the input unit 6 (in a step S2 of FIG. 3), the input speech is converted into speech features by the feature extracting unit 2 (in a step S3).

Figure 2:
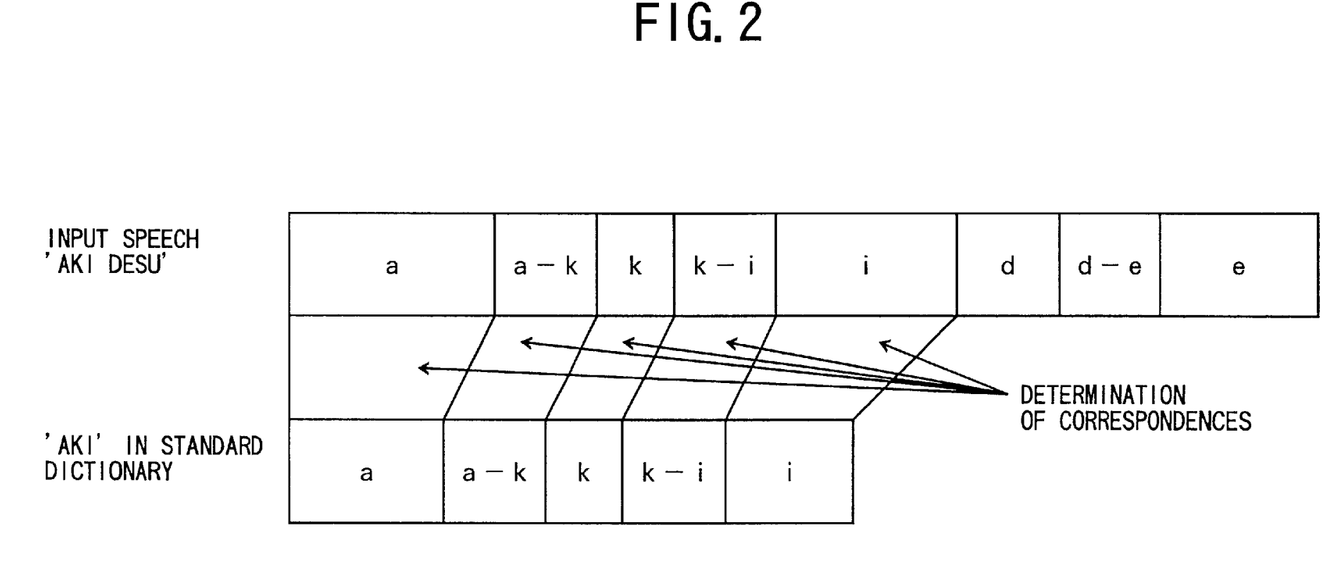
FIG. 2 shows an example of a manner in which correspondence between phonemes (input phonemes) which are features of an input speech, for example, 'aki', and phoneme information in a standard dictionary is determined.
Figure 3:
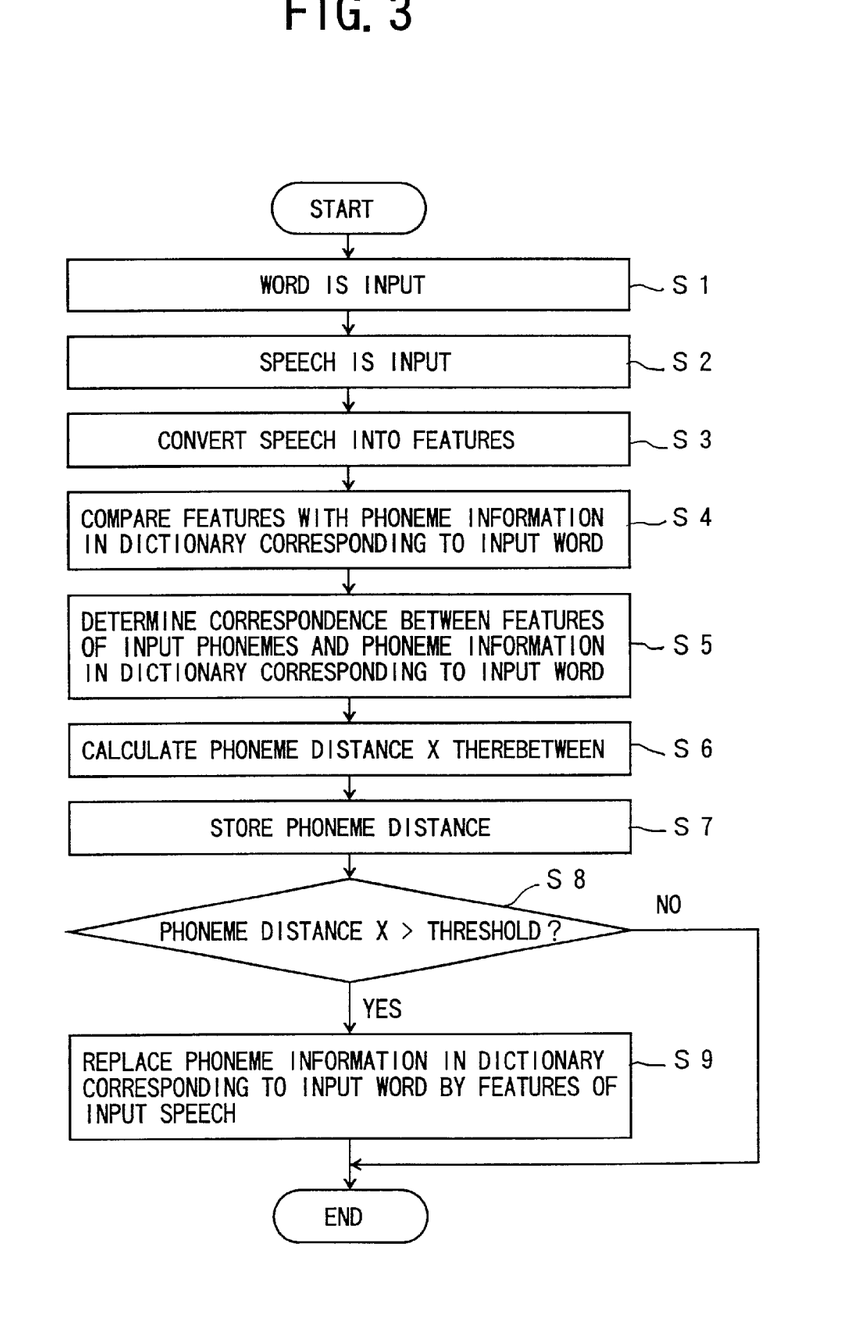
FIG. 3 is an operation flow chart showing operation of the speech-recognition device shown in FIG. 1 for a case where pronunciation of a word is performed for registration.

The speech features obtained through the conversion by the feature extracting unit 2, then, undergoes path search and similarity operation in the matching unit 3 (in a step S4). In the process of path search, by using the phoneme information and information (path information) of phoneme transition, as shown in FIG. 2, the correspondence between the phonemes (input phonemes) which are the speech features of the input speech, for example, 'aki', and the phoneme information in the standard dictionary 1 corresponding to the string of characters 'aki' is determined in phoneme units (in a step S5). When the correspondence between the input phonemes and the phoneme information in the standard dictionary 1 is determined in phoneme units, the phoneme distance X (similarity measure) between the features of the input phonemes and the corresponding phoneme information in the standard dictionary 1 is obtained (the phoneme-distance evaluation is performed) as described above (in a step S6). The thus-obtained distance is stored temporarily (in a step S7). After the matching between the input phonemes and phoneme information in the standard dictionary 1 is thus finished in the matching unit 3, the dictionary updating unit 5 updates the phoneme information in the standard dictionary 1 in accordance with the following procedure.

That is, first, the dictionary updating unit 5 determines (in a step S8) whether or not the phoneme distance X between the features of the input phonemes and the corresponding phoneme information in the standard dictionary 1, temporarily stored as mentioned above, exceeds the predetermined threshold. As a result, when the phoneme distance X between the features of the input phonemes and the corresponding phoneme information in the standard dictionary 1 does not exceed the predetermined threshold (No of the step S8), the corresponding phoneme information in the standard dictionary 1 can be regarded as being similar to the input speech of the dependent speaker and well reflecting the features of the speech of the dependent speaker. Therefore, the dictionary updating unit 5 does not update the phoneme information of the standard dictionary 1.

In contrast to this, when the phoneme distance X between the features of the input phonemes and the corresponding phoneme information in the standard dictionary 1, temporarily stored as mentioned above, exceeds the predetermined threshold (Yes in the step S8), the corresponding phoneme information in the standard dictionary 1 cannot be regarded as well reflecting the features of the speech of the dependent speaker. Therefore, the dictionary updating unit 5 replaces the phoneme information in the standard dictionary 1 with the features of the input phonemes (in a step S9).

Figure 4:
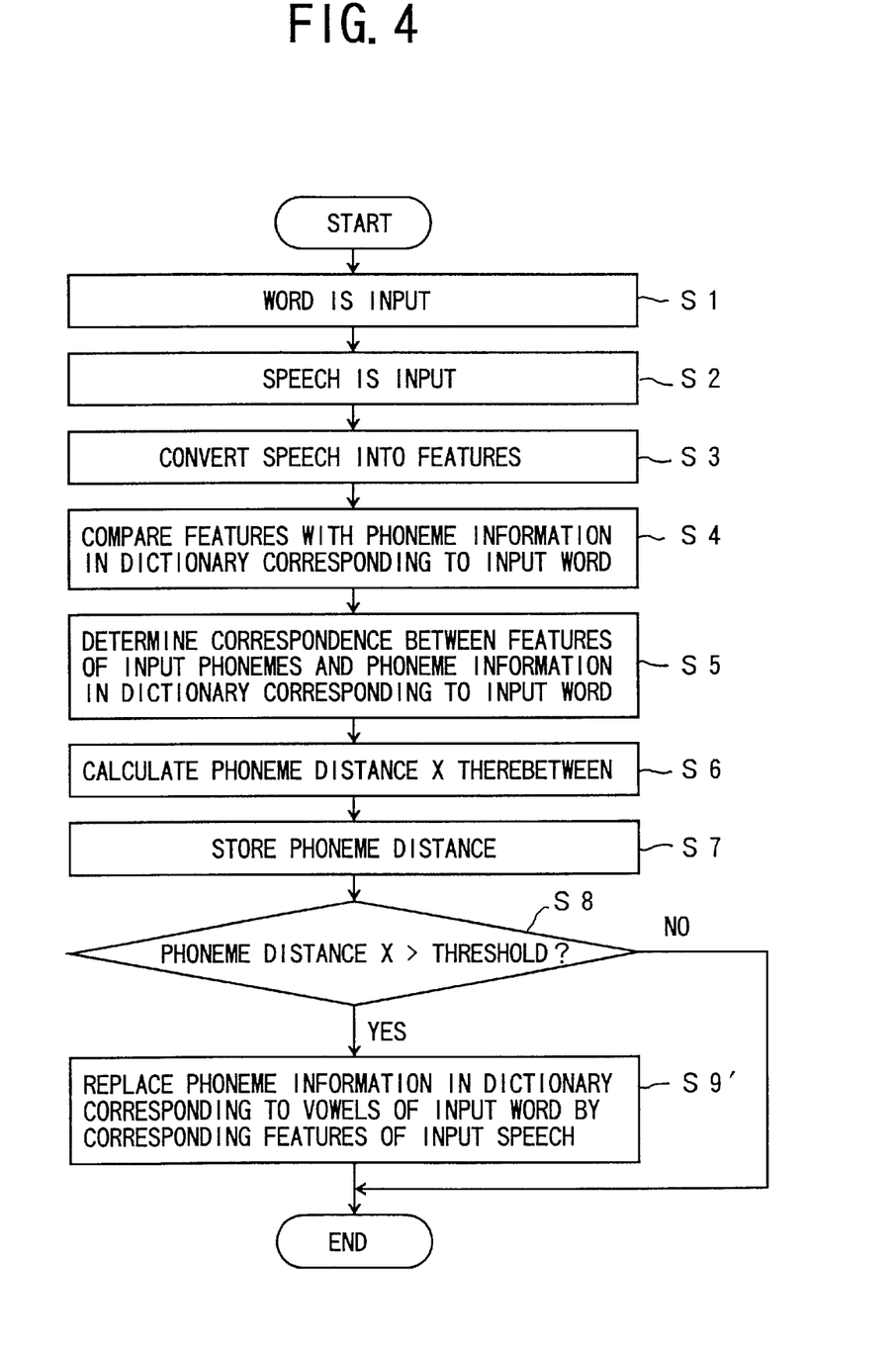
FIG. 4 is an operation flow chart showing operation of a variant embodiment of the speech-recognition device shown in FIG. 1 (updating phoneme information only for vowels) for a case where pronunciation of a word is performed for registration.

At this time, it is possible to perform updating of the phoneme information only for the vowels of the string of characters. When only the vowels are to be updated, it is determined, using the information of the string of characters, which phonemes correspond to the vowels. Then, each phoneme which is determined as corresponding to a vowel has a tag which indicates that the phoneme corresponds to a vowel attached thereto. Then, for the phonemes having the tags, the same processing as the above-described one is performed, as described above, as shown in FIG. 4.

Figure 5:
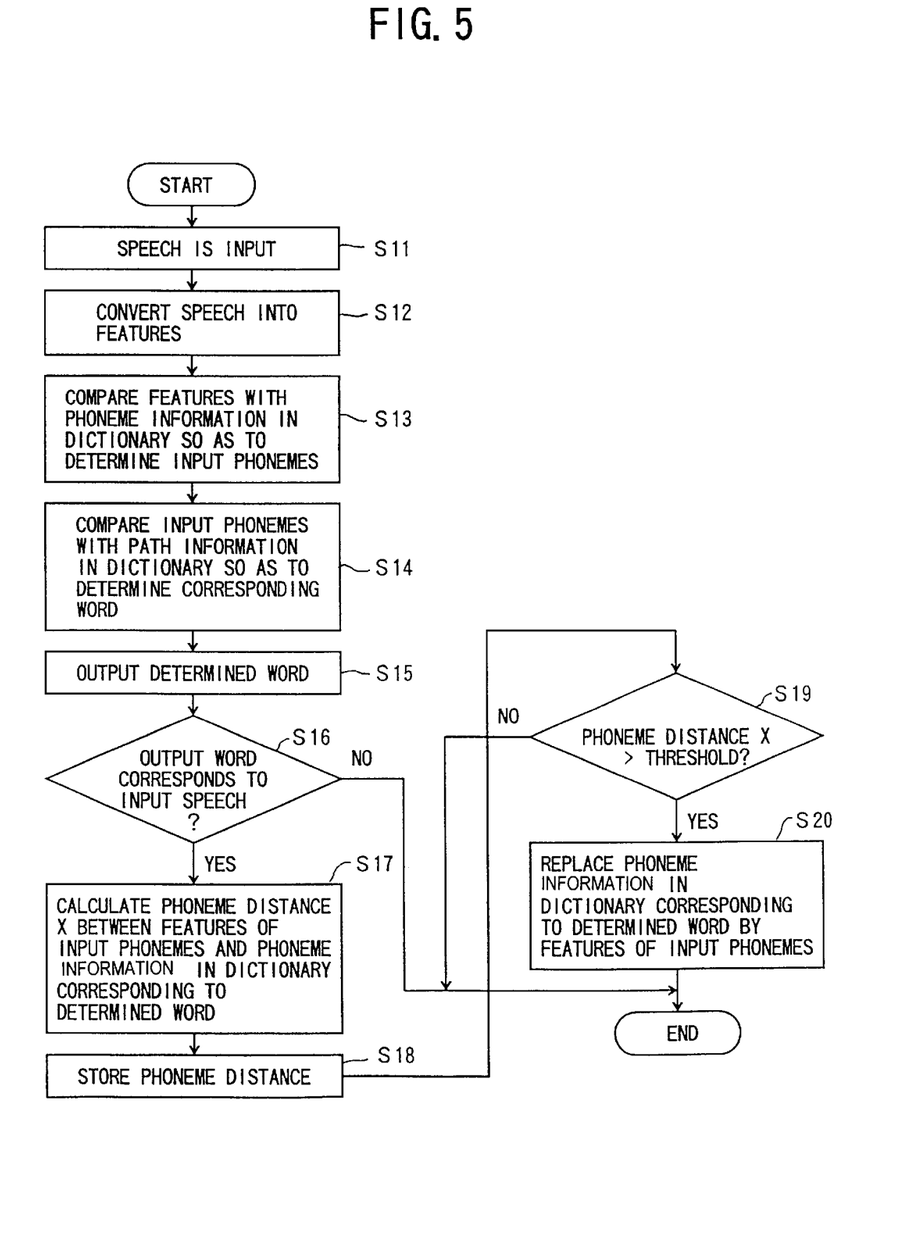
FIG. 5 is an operation flow chart showing operation of the speech-recognition device shown in FIG. 1 for a case where pronunciation of a word is performed for speech recognition.
Figure 6:
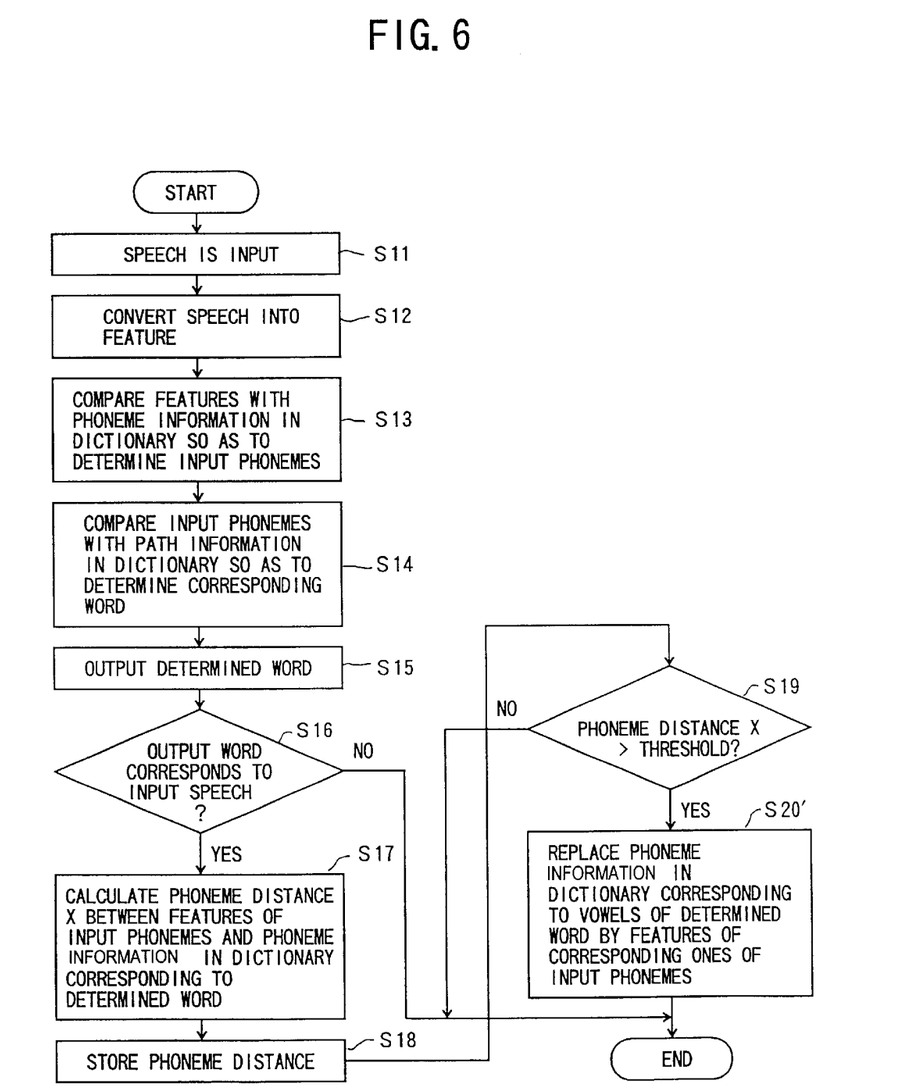
FIG. 6 is an operation flow chart showing operation of the variant embodiment of the speech-recognition device shown in FIG. 1 (updating phoneme information only for vowels) for a case where pronunciation of a word is performed for speech recognition.

Then, description will now be made for the case where pronunciation for speech recognition is performed. In the case where pronunciation for speech recognition is performed, the following procedure is added to the above-described procedure for the case where pronunciation for registration is performed. That is, in the case where pronunciation for speech recognition is performed (in steps S11–S14 of FIG. 5), it is necessary that the speaker confirms (in a step S16) the recognition result output by the result outputting unit 4 (in a step S15). That is, when a speech to be input is a speech for registration, a word to be pronounced is previously determined before actual pronunciation of the word is performed (what is the word which will be pronounced from now is not only known by the dependent speaker but also is recognized by the matching unit 3 as a result of this matter being previously input to the matching unit 3 by the dependent speaker in a step 1 of FIG. 3). Therefore, in this case, the dictionary updating processing is properly performed when pronunciation of the word is performed and the above-described procedure is performed. However, in the case where pronunciation for speech recognition is performed, there is a possibility that the speech-recognition device erroneously recognizes the speech even when the similarity measure obtained through the matching performed by the matching unit 3 has a large value. In order to avoid such a problematic situation, it is necessary to perform the above-described procedure (steps S17–S20) after the dependent speaker confirms that the recognition result output from the speech-recognition device is correct (Yes in the step S16).

Thus, in the preferred embodiment of the present invention, the standard dictionary 1 is built initially as a dictionary to be used for recognizing speeches produced by any independent speaker. Then, the dictionary updating unit 5 updates the standard dictionary 1 based on the result of matching of features extracted from an input speech against the standard dictionary 1. Therefore, in order to build a dictionary to be used for recognizing speeches produced by a dependent speaker by updating the standard dictionary 1, the dependent speaker should produce a speech only once. Thus, it is possible to build the dictionary to be used for recognizing speeches produced by the dependent speaker without burdening the dependent speaker much.

Further, in the preferred embodiment of the present invention, in accordance with the recognition result (similarity measure), the entire dictionary is not updated, but only features of phonemes in the dictionary are updated. Thereby, in the arrangement of the speech-recognition device, it is possible to reduce a storage capacity needed as a volatile memory.

Figure 7:
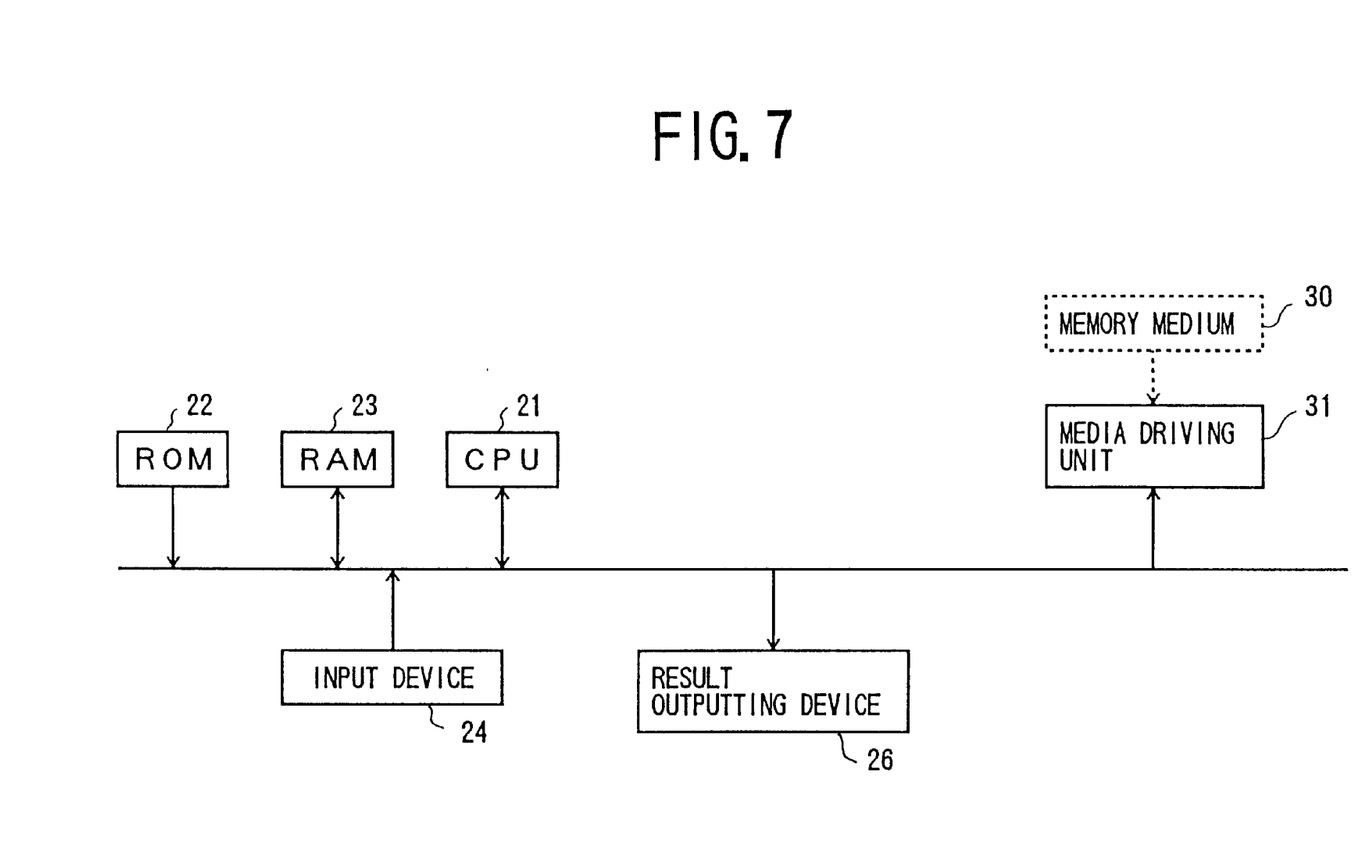
FIG. 7 is a block diagram showing a hardware configuration of the speech-recognition device shown in FIG. 1.

FIG. 7 is a block diagram showing one example of a hardware configuration of the speech-recognition device shown in FIG. 1. As shown in FIG. 7, the speech-recognition device may be implemented by using a personal computer or the like, and includes a CPU 21, a ROM 22, a RAM 23, an input device 24, and a result outputting device 26. The CPU 21 attends to overall control. The ROM 22 stores control programs and the like used by the CPU 21. The RAM 23 is used as a work area used by the CPU 21. The input device 24 is used for inputting a speech. The result outputting device (e.g., display or printer) 26 outputs speech-recognition results.

The CPU provides functions of the feature extracting unit 2, the matching unit 3, the dictionary updating unit 5, etc., shown in FIG. 1.

The functions of the feature extracting unit 2, the matching unit 3, the dictionary updating unit 5, etc., are implemented via software, which is supplied in a software package stored in a memory medium such as a CD-ROM. In FIG. 7, therefore, the speech-recognition device further includes a media driving unit 31, which drives a memory medium 30 when it is set in the driving unit 31.

In other words, the speech-recognition device according to the present invention may be implemented such that a general-purpose computer system has programs loaded thereto from a memory medium such as a CD-ROM, and allows a micro-processor thereof to execute speech-recognition processing. In this configuration, programs for performing speech-recognition processing of the present invention (i.e., programs used by the hardware system) are supplied by way of a memory medium. The memory medium for storing the programs is not limited to a CD-ROM, but includes a ROM, a RAM, a flexible disk, a memory card, etc. The programs stored in the memory are installed in a memory device built in as part of the hardware system. An example of such a memory device is a hard-disk drive. The programs are executed so as to provide functions of the speech-recognition processing.

The programs for providing the speech-recognition processing of the present invention may be supplied via a communication channel from a server, for example, instead of being supplied in the form of a memory medium.

Further, the present invention is not limited to the above-described embodiment and variations and modifications may be made without departing from the scope of the present invention.

The present application is based on Japanese priority application No. 11-019555, filed on Jan. 28, 1999, the entire contents of which are hereby incorporated by reference.

What is claimed is:

1. A device for speech recognition comprising:

a standard dictionary;

a feature extracting unit which extracts features from an input speech;

a matching unit which performs matching of the features of the input speech extracted by said feature extracting unit against said standard dictionary;

a result outputting unit which outputs a matching result in said matching unit; and a dictionary updating portion which updates said standard dictionary, wherein:

said standard dictionary is built initially as a dictionary to be used for recognizing speeches produced by any independent speaker;

said dictionary updating portion updates said standard dictionary so as to provide a dictionary to be used for recognizing speeches produced by a dependent speaker based on the result of matching of the features extracted from the input speech against said standard dictionary; and said standard dictionary is built initially as a dictionary, to be used for recognizing speeches produced by any independent speaker, as a result of standard features of each string of characters being disintegrated into phoneme units, the thus-obtained features of the respective phonemes being used as phoneme information, and the connection of the phonemes being used as path information;

said matching unit, when comparing features of input phonemes determined from the features extracted from the input speech for a string of characters with the phoneme information in said standard dictionary corresponding to said string of characters, performs evaluation of phoneme distance between the features of the input phonemes and the phoneme information in said standard dictionary corresponding to said string of characters; and said dictionary updating portion, based on the result of said evaluation of phoneme distance, updates the phoneme information in said standard dictionary corresponding to said string of characters, and, thus, updates said standard dictionary so as to provide a dictionary to be used for recognizing speeches produced by a dependent speaker, wherein said dictionary updating portion updates the phoneme information in said standard dictionary corresponding to said string of characters, and, thus, updates said standard dictionary, only when the phoneme distance between the features of the input phonemes and the phoneme information in said standard dictionary corresponding to said string of characters exceeds a predetermined threshold as a result of said evaluation of phoneme distance, such that said updating portion does not update said standard dictionary when the phoneme distance between the features of the input phonemes and the phoneme information in said standard dictionary corresponding to said string of characters does not exceed said predetermined threshold.

2. A device for speech recognition comprising:

a standard dictionary;

a feature extracting unit which extracts features from an input speech;

a matching unit which performs matching of the features of the input speech extracted by said feature extracting unit against said standard dictionary;

a result outputting unit which outputs a matching result in said matching unit; and a dictionary updating portion which updates said standard dictionary, wherein:

said standard dictionary is built initially as a dictionary to be used for recognizing speeches produced by any independent speaker;

said dictionary updating portion updates said standard dictionary so as to provide a dictionary to be used for recognizing speeches produced by a dependent speaker based on the result of matching of the features extracted from the input speech against said standard dictionary; and said standard dictionary is built initially as a dictionary, to be used for recognizing speeches produced by any independent speaker, as a result of standard features of each string of characters being disintegrated into phoneme units, the-thus-obtained features of the respective phonemes being used as phoneme information, and the connection of the phonemes being used as path information;

said matching unit, when comparing features of input phonemes determined from the features extracted from the input speech for a string of characters with the phoneme information in said standard dictionary corresponding to said string of characters, performs evaluation of phoneme distance between the features of the input phonemes and the phoneme information in said standard dictionary corresponding to said string of characters; and said dictionary updating portion, based on the result of said evaluation of phoneme distance, updates the phoneme information in said standard dictionary corresponding to said string of characters, and, thus, updates said standard dictionary so as to provide a dictionary to be used for recognizing speeches produced by a dependent speaker, wherein said dictionary updating portion updates the phoneme information in said standard dictionary corresponding to the vowels of said string of characters, and, thus, updates said standard dictionary, only when the phoneme distance between the features of the input phonemes and the phoneme information in said standard dictionary corresponding to said string of characters exceeds a predetermined threshold as a result of said evaluation of phoneme distance, such that said dictionary updating portion does not update said standard dictionary when the phoneme distance between the features of the input phonemes and the phoneme information in said standard dictionary corresponding to said string of characters does not exceed said predetermined threshold.

3. A device for speech recognition comprising:

standard dictionary means;

feature extracting means for extracting features from an input speech;

matching means for performing matching of the features of the input speech extracted by said feature extracting means against said standard dictionary means;

result outputting means for outputting a matching result in said matching means; and dictionary updating means for updating said standard dictionary means only when the difference between the features of the extracted input speech and said standard dictionary means exceeds a predetermined threshold, wherein:

said standard dictionary means is built initially as dictionary means to be used for recognizing speeches produced by any independent speaker; and when the difference between the features of the extracted input speech and said standard dictionary means exceeds said threshold, said dictionary updating means updates said standard dictionary means so as to provide dictionary means to be used for recognizing speeches produced by a dependent speaker based on the result of matching of the features extracted from the input speech against said standard dictionary means.

4. A method of conducting speech recognition, comprising the steps of:

a) extracting features from an input speech;

b) performing matching of the features of the input speech extracted in said step a) against a standard dictionary;

c) outputting a matching result of said step b); and d) updating said standard dictionary only when the phoneme distance between the features of the extracted input speech and the standard dictionary exceeds a predetermined threshold, wherein:

said standard dictionary is built initially as a dictionary to be used for recognizing speeches produced by any independent speaker; and said step d) comprises the step of updating said standard dictionary so as to provide a dictionary to be used for recognizing speeches produced by a dependent speaker based on the result of matching of the features extracted from the input speech against said standard dictionary.

5. A machine-readable memory medium having a program embodied therein for causing a computer to perform a speech recognition, said program comprising:

a standard dictionary;

a feature extracting unit configured to extract features from an input speech;

a matching unit configured to perform matching of the features of the input speech extracted by said feature extracting unit against said standard dictionary;

a result outputting unit configured to output a matching result in said matching unit; and a dictionary updating portion configured to update said standard dictionary only when the phoneme distance between the features of the extracted input speech and the standard dictionary exceeds a predetermined threshold, wherein:
said standard dictionary is built initially as a dictionary to be used for recognizing speeches produced by any independent speaker; and
said dictionary updating portion updates said standard dictionary so as to provide a dictionary to be used for recognizing speeches produced by a dependent speaker based on the result of matching of the features extracted from the input speech against said standard dictionary.

* * * * *